No. 776,449. PATENTED NOV. 29, 1904.
G. M. ANDERSSON & A. G. AHLSTROM.
MIXING MACHINE.
APPLICATION FILED DEC. 29, 1903.
NO MODEL. 2 SHEETS—SHEET 1.
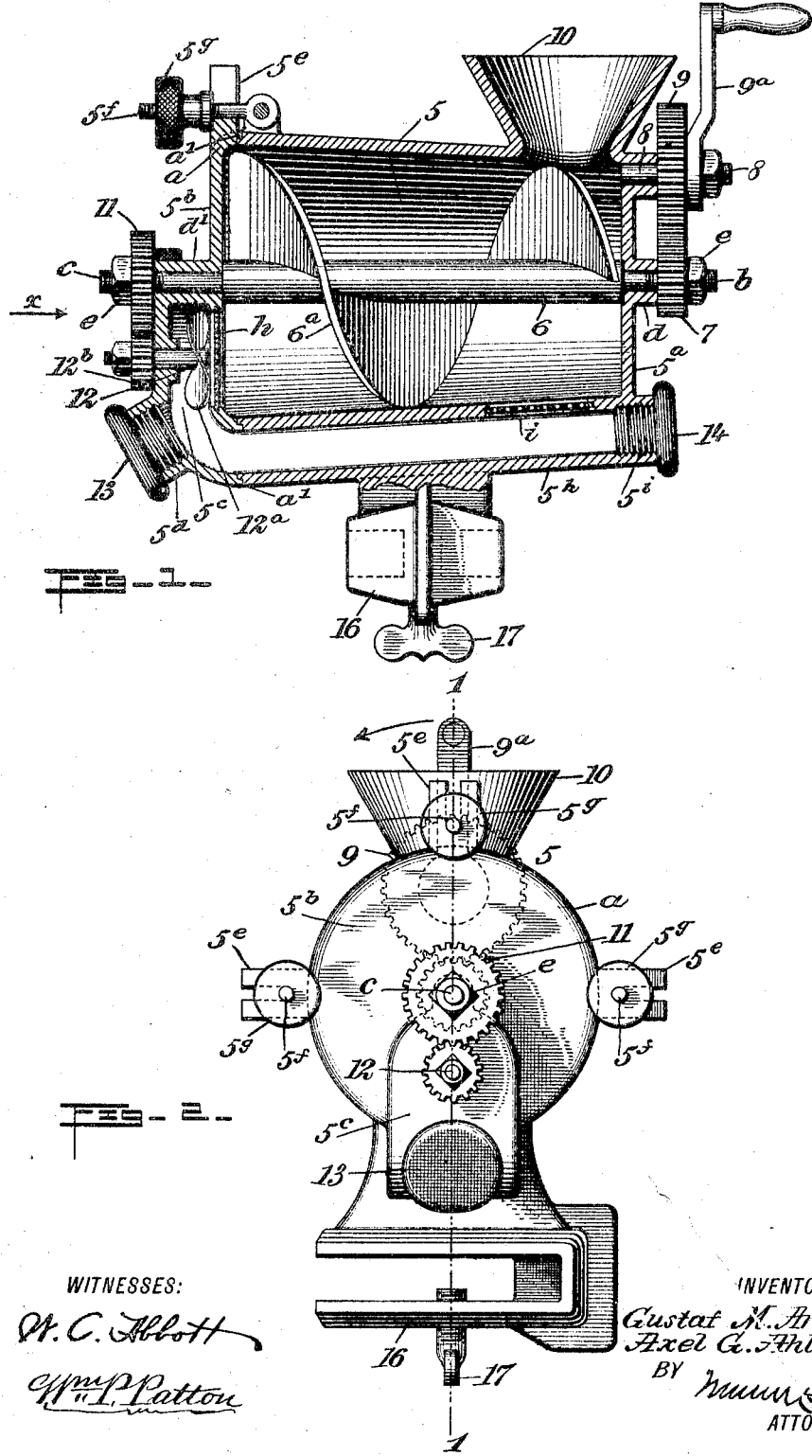
WITNESSES:
W. C. Abbott
Wm P. Patton
INVENTORS
Gustaf M. Andersson
Axel G. Ahlstrom
BY
ATTORNEYS No. 776,449. PATENTED NOV. 29, 1904.
G. M. ANDERSSON & A. G. AHLSTROM.
MIXING MACHINE.
APPLICATION FILED DEC. 29, 1903.
NO MODEL. 2 SHEETS—SHEET 2.
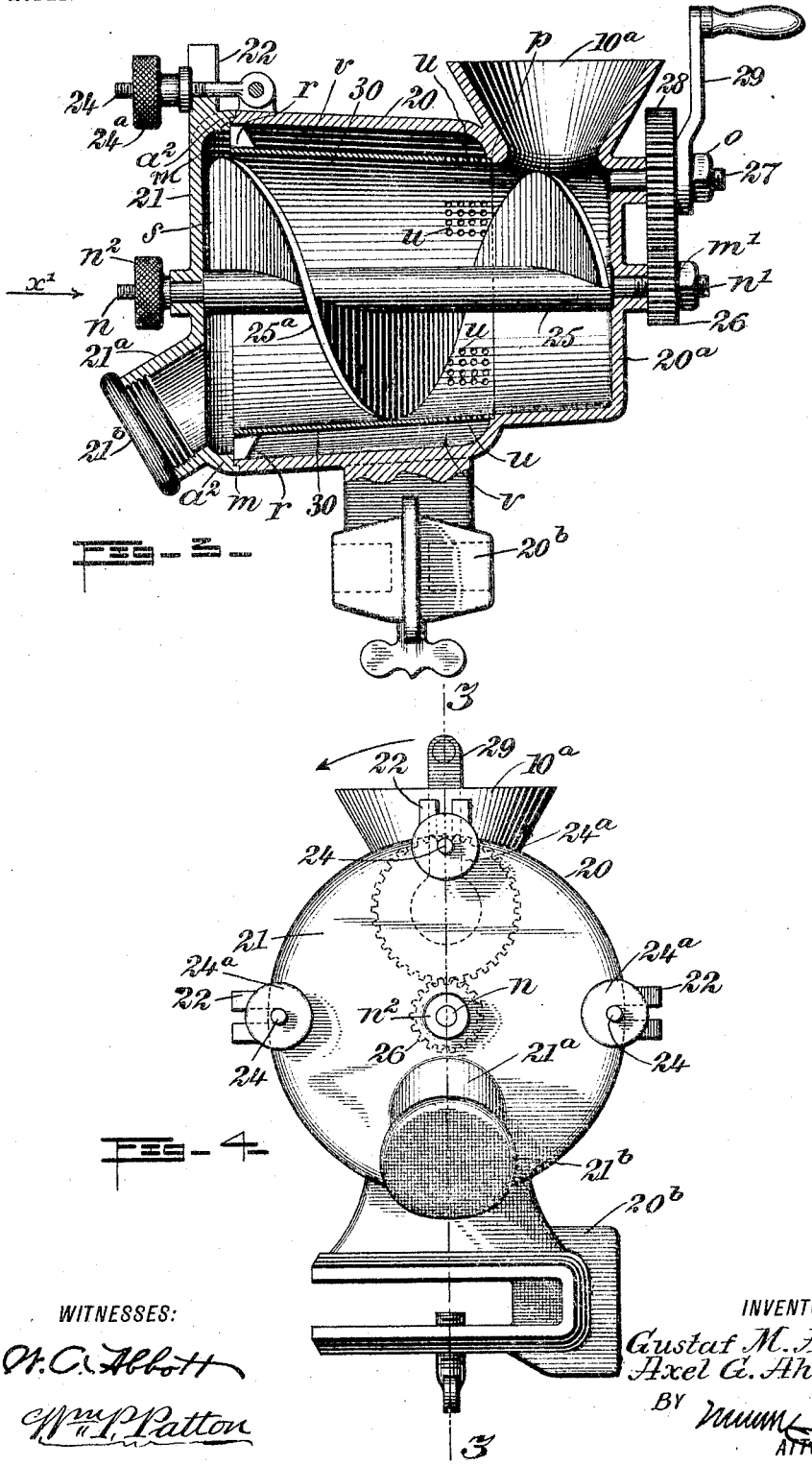
WITNESSES:
O. C. Abbott
Wm. P. Patton
INVENTORS
Gustaf M. Andersson
Axel G. Ahlstrom
BY
ATTORNEYS No. 776,449. Patented November 29, 1904.

UNITED STATES PATENT OFFICE.

GUSTAF M. ANDERSSON AND AXEL G. AHLSTROM, OF HYDEPARK, MASSACHUSETTS.

MIXING-MACHINE.

SPECIFICATION forming part of Letters Patent No. 776,449, dated November 29, 1904.

Application filed December 29, 1903. Serial No. 186,989. (No model.)

*To all whom it may concern:*

Be it known that we, GUSTAF M. ANDERSSON, a subject of the King of Sweden and Norway, and AXEL G. AHLSTROM, a citizen of the United States, both residents of Hydepark, in the county of Norfolk and State of Massachusetts, have invented a new and Improved Mixing-Machine, of which the following is a full, clear, and exact description.

This invention relates to machines employed for mixing liquids or plastic materials so as to render the mass homogeneous and thoroughly blend together the compound elements, and has for its object to provide novel details of construction for a material-mixing device, which adapt it for convenient use, render it perfect in operation, and enable the quick detachment of its several parts to facilitate the thorough cleansing of the interior of the machine.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a longitudinal sectional view of one form of construction that embodies features of the invention, taken substantially on the line 1 1 in Fig. 2. Fig. 2 is an end view of the device shown in Fig. 1 seen in the direction of arrow $x$ in said figure. Fig. 3 is a longitudinal sectional view of a mixing device modified in its details, but embodying essential features of the invention, the section being taken substantially on the line 3 3 in Fig. 4; and Fig. 4 is an end view of the mixing device shown in Fig. 3 seen in direction of arrow $x'$ in said figure.

The improved mixing-machine may be operated by any source of power and rotary motion. As shown it is adapted for detachable connection upon a proper support to be actuated by hand-power.

Referring to Figs. 1 and 2, wherein one example of our invention appears, 5 represents the shell for the hollow body of the mixing device, that is preferably cast into shape from metal, having an essentially conico-cylindrical form of suitable dimensions, the length of the body exceeding its diameter considerably. The interior surface of the tapering wall of the body 5 is rendered true from end to end, and at the smaller end the body is closed by the transverse wall or head $5^a$. At the opposite end of the hollow body 5, which terminates in a circular rabbeted edge, a closing-head or end wall $5^b$ is fitted, said end wall having an integral flange $a$, formed on its edge portion, which extends at one side thereof and is rabbeted to fit neatly in engagement with the rabbet on the end of the body 5, as shown at $a'$ in Fig. 1. A shaft 6 is journaled at its ends $b$ $c$, respectively, in opposite perforations formed in the stationary end wall $5^a$ and removable end wall $5^b$ and also in hubs $d$ $d'$, formed, respectively, on the exterior of the end walls $5^a$ $5^b$. Upon the shaft 6 a spiral blade $6^a$ is formed or secured—that is, loosely fitted at its edge against the conico-cylindrical inner surface of the body 5—and at one end thereof has a loose contact with the true inner surface of the head or end wall $5^b$. Upon the end portion $b$ of the shaft 6, that extends beyond the true end of the hub $d$, a pinion 7 is secured by any suitable means, and upon a stub-shaft 8, that projects from the end wall $5^a$ at a proper distance from and in a plane parallel with the central shaft 6, a spur-gear 9 of greater diameter than the pinion 7 is rotatably mounted and meshed with said pinion, said spur-gear having a crank-handle $9^a$ secured thereto at its outer side, which by manipulation will rotate said gear and also give rotary motion to the shaft 6 and spiral blade $6^a$. A preferably funnel-shaped hopper 10 is formed on or secured upon the body 5 near the end whereon the stub-shaft 8 is secured, said hopper having open communication with the interior of the hollow body adjacent to the end wall $5^a$ thereon. At the opposite end of the shaft 6 the journal $c$ thereon is extended sufficiently to receive a spur-gear 11, that may be secured by any means, but preferably as shown and hereinafter described. A chamber or conduit-section $5^c$ is formed on the exterior of the head or end wall $5^b$, which extends from the integral hub $d'$ toward and beyond the periphery of the head $5^b$ and is curved at the outer end to conform with the curvature of the peripheral flange $a$, as is shown in Fig. 1. In the exterior wall of the conduit-section $5^c$ at a suitable distance from the hub $d'$ a short shaft 12 is journaled, having secured on its end located within the chamber or conduit-section $5^c$ a suction and forcing screw-blade $12^a$. Upon the portion of the shaft 12 that extends outside of the outer wall of the chamber $5^c$ a pinion $12^b$ is mounted and affixed, the pinion having meshed engagement with the spur-gear 11. On the outer wall of the chamber $5^c$, below the pinion $12^b$, an interiorly-screw-threaded outlet-nozzle $5^d$ is formed, which is normally closed by an exteriorly-threaded sealing-plug 13. The free lower edge that defines the open end of the chamber $5^c$ is rabbeted to form a continuation of the rabbeted edge $a'$ on the flange $a$. To facilitate the removal of the pinion 7 and spur-gear 11 from the opposite ends $b$ and $c$ of the shaft 6, these ends are threaded, and the bores of the pinion and gear are also threaded to permit them to be respectively screwed thereon, and upon the portions of said threaded ends of the shaft that project outside of the pinion and gear a nut $e$ is screwed on each end and forced against the gear and pinion, which will prevent said pinion and gear from turning on the shaft, and it will be seen that by unscrewing the nuts and the parts upon which they bear the pinion and gear may be quickly removed when this is desired. The loose head $5^b$ is further secured upon the end of the body 5 by the formation of the spaced and slotted ears $5^e$ thereon, that receive in their slots the clamping-bolts $5^f$, which are pivoted at one end of each bolt upon projections from the exterior of the body 5, near the rabbeted edge thereof. The clamping-bolts $5^f$ are threaded at and near their free ends, and the portions which project outside of the ears $5^e$ each receive a clamping-nut $5^g$, which may be jammed against the ears, and thus clamp the head $5^b$ against the edge of the shell or body 5, so as to seal the joint between the rabbeted edges of the body and flange $a$. On the exterior of the body 5 at a point that locates one end opposite the free lower end of the conduit-section $5^c$ a conduit-section $5^h$ is longitudinally formed or secured thereon and extends beyond the end wall $5^a$ of the body 5, as is shown in Fig. 1. The end of the conduit-section $5^h$ near the end wall $5^b$ has its edge rabbeted for an engagement with the rabbeted free lower end of the conduit-section $5^c$, and obviously the enforced contact of said ends of the conduit, that may be quickly effected by an adjustment of the nuts $5^g$ on the bolts $5^f$, will render the joint between said parts tight if the edges are true. Opposite the screw-blade $12^a$ the inner wall of the conduit-section $5^c$ is foraminated, thus providing numerous fine passages for the flow of liquid from the interior space in the body 5 into said conduit-section, and, as is shown in Fig. 1, a screen-plate $h$ may be provided, that is held in a suitable opening in the inner wall of the chamber, and thus affords the foraminated area above mentioned. In the shell or side wall of the body 5, near the end wall $5^a$ and opposite the conduit $5^h$, an opening is formed covered with a reticulated or foraminated screen-plate $i$, or, if preferred, perforations may be formed in the wall of the shell 5. The end $5^i$ of the conduit $5^h$ adjacent to the integral end wall $5^a$ of the body 5 is threaded for the insertion of a screw-plug 14, which normally seals said end of the conduit, and upon the lower or exterior wall of said conduit, near the longitudinal center thereof, a looped bracket 16 is formed, having a screw 17 in one member, this provision permitting the device complete to be secured upon a table or the like for use. In service the material to be mixed, which may be partly liquid and partly plastic or powdered and which is to be thoroughly blended, is placed in the hopper 10 and thence passes down into the shell or body 5 at the upper side of the shaft 6. Upon rotation of the crank-handle $9^a$ in direction of the curved arrow in Fig. 2—that is to say, from right to left—the spiral blade $6^a$ will be revolved in a proper direction to propel the material toward the screen-plate $h$ and through the fine perforations therein, so that the material moved by the spiral blade $6^a$ is forced into the conduit-section $5^c$ and thence through the conduit-section $5^h$ to pass into the main chamber in the body 5 through the fine perforations in the screen-plate $i$. It will be observed that simultaneously with the rotation of the spiral blade $6^a$ the geared connection of the shaft 6 with the short shaft 12 will rotate the latter and rapidly turn the screw-blade $12^a$, which will coact with the spiral blade to transfer the material from the main chamber in the shell or body 5 into the conduit chamber or section $5^c$ and thence force such material along in the return-conduit $5^h$ and through the foraminated plate $i$ into the main chamber. It will be seen that the described operation if continued will effect a continuous progressive movement of the material from one end of the main chamber in the shell or body 5 toward the opposite end and through the foraminated end wall $5^b$ into the return-conduit $5^c 5^h$, that in turn discharges through the foraminated wall or plate $i$ into the main chamber near its opposite end, this cyclic movement of the liquid or plastic material serving to thoroughly mix and blend the same. It is to be understood that if the material operated upon can be thoroughly mixed by the passage of the same through the foraminations in the screen $h$ it may be pressed toward the opposite end of the conduit $5^h$ and discharged therefrom upon removal of the sealing-plug 14; but if the material is to be continuously operated upon until it has passed through the conduit more than once the conduit is kept sealed until the material is perfectly mixed and blended. If a single return movement of the material from the main chamber 5 through the screen $h$ into the return-conduit $5^e$ and along the conduit $5^h$ is sufficient to complete the mixing operation, the feeding of material into the hopper 10 may be continuous and graded in quantity to insure the proper operation of the machine. At any time it is desired the loose head or end wall $5^b$ may be removed to permit cleaning of the machine, or if it is only necessary to cleanse the conduit this can be effected readily by removing both sealing-plugs 13 14, which will fully expose the interior of the conduit.

In Figs. 3 and 4 there is shown another embodiment of the invention, consisting of the following details: The shell or body 20 is substantially conico-cylindrical and provided with a hopper $10^a$, that encircles an opening in the upper side of the shell near the integral end wall $20^a$. A removable end wall or head 21 is held clamped upon the rabbeted edge $m$ of the shell 20 by means of the slotted ears 22, that are similar to the ears $5^e$, and the hinged bolts 24, that are like the pivoted bolts $5^f$, the bolts 24 being provided with the knurled nuts $24^a$, similar to the nuts $5^g$, and which by their screwed adjustment clamp the head upon the edge of the shell 20, as before mentioned. Centrally in the end wall $20^a$ and removable head 21 perforations are formed, which receive the journaled ends $n n'$ of a shaft 25, which is provided with the spiral blade $25^a$, that projects radially therefrom, it being the same in shape as the spiral blade $6^a$. On the end $n$ of the shaft 25 a thread is formed outside of the journal thereon, and upon the threaded portion of the extension $n$ an adjusting-nut $n^2$ is mounted, which bears upon the outer surface of the head 21. Upon the opposite journal end $n'$, which is extended beyond its bearing in the end wall $20^a$, a pinion 26 is mounted, and preferably the portion of the journal end $n'$ that receives the pinion, as well as the portion that extends outside of said pinion, is threaded, and the bore of the pinion is similarly threaded to permit it to be screwed upon said journal end until the pinion loosely contacts with the end wall $20^a$, and a jam-nut $m'$ is screwed upon the end of the shaft, so as to bear on the pinion 26, which prevents the latter from unscrewing. A stub-shaft 27 projects from the end wall $20^a$ in a plane parallel with the shaft 25, and upon said stub-shaft a spur-gear 28 is mounted to turn. A crank-handle 29 is secured upon the outer side of the spur-gear 28, and the handle, together with said gear, is held from displacement by the nut $o$. The details, which have been briefly described, do not differ essentially from corresponding parts that are represented in Figs. 1 and 2 and have been hereinbefore fully described. In this construction, however, the return-conduit for material, which is a main feature of the invention, is given annular form, as will now be explained. An annular offset $p$ is formed in the shell 20 near the opening therein encircled by the hopper $10^a$. A conico-cylindrical inner wall 30 is held concentrically within the shell 20 by an engagement of the edge of its smaller end in a rabbet formed interiorly in the offset $p$ and also by the engagement of a number of similar spacing-ears $r$, that project radially from the wall 30 at its opposite end with the inner surface of the shell 20 near its rabbeted circular edge $m$. It will be seen that the ears $r$ are pressed on their radial edges that are near the removable head 21 by the inwardly-trending edge portion of the flange $a^2$, that projects laterally from the periphery of the head 21, so that a clamping adjustment of the thumb-nuts $24^a$ will bind the edge of the flange $a^2$ upon the ears $r$ and hold the inner wall 30 concentric and stationary within the shell 20. The relative diameter of the conico-cylindrical inner wall 30, at the smaller end thereof, is such that said wall when in place will conform with the coniform shape and diametrical dimension of the wall of the shell 20 that extends from the offset $p$ toward and to the integral end wall $20^a$, which will adapt the peripheral edge of the spiral blade $25^a$ to have a loose contact throughout its extent upon the inner surface of the concentric wall 30 and smaller end portion of the shell 20, that is virtually an extension of said wall 30. The radial edge $s$ of the spiral blade $25^a$, that is adjacent to the inner surface of the removable head 21, is true and is held to rotate with the shaft 25 close to said head by adjustment of the thumb-nut $n^2$. An outlet-nipple $21^a$ is formed on the head 21 for the discharge of mixed material, this outlet being normally closed by a sealing-plug $21^b$, and, as shown, said nipple projects from the head below the journal end $n$ of the shaft 25. In the concentric inner wall 30 a plurality of spaced groups of fine perforations are formed, as shown at $u$ in Fig. 3, these perforations being located near the smaller end of the wall 30, that is engaged with the rabbet in the offset $p$, or at the inner termination of the annular conduit $v$, that is afforded between the inner wall 30 and the shell 20. The shell 20 is preferably provided with a clamping device $20^b$ of ordinary construction, which enables the detachable connection of the mixing-machine with or upon a stable support. In use the material, which may be liquid or partly so, is introduced within the main chamber or interior of the shell 20 through the hopper $10^a$, and the crank-handle 29 is rotated in direction of the curved arrow in Fig. 4. This rotary movement of the handle 29 will be transmitted to the shaft 25 and spiral blade $25^a$, which will propel the material toward the larger end of the shell 20 and force it into the annular channel or conduit $v$ between the ears $r$ and toward the offset $p$, where the annular conduit terminates. The arrest of the moving material at the offset $p$ causes lateral pressure to force the material through the groups of perforations $u$ from the annular conduit into the main chamber within the shell 20, and it is obvious that a continuation of the operation will establish a continuous circulation of the material, passing it periodically through the perforations $u$, which will perfectly mix and blend the component ingredients of material operated upon. When the operation on a certain amount of material results in its complete mixture, such mixed liquid or plastic material may be expelled from the machine by a removal of the sealing-plug $21^b$ and a resumption of the rotatable movement of the crank-handle 29, which will propel all or a large portion of the mixed material from the machine.

It will be apparent from the foregoing description that the most essential features of the invention are the provision of a return-passage for material from the main chamber at one end thereof toward the other end and the provision of restricted openings between the main chamber and the conduit or return-chamber, which will cause the intimate admixture and thorough blending of ingredients forming the material operated upon by the machine.

Having thus described our invention, we claim as new and desire to secure by Letters Patent—

1. A mixing-machine embodying a conico-cylindrical shell, having an inlet and an outlet, a longitudinally-extended shaft central in the shell and having a spiral blade that engages the inner side of the shell, a conduit on the normal lower side of the shell and communicating at each end of the conduit therewith, the passages between the ends of the conduit and shell being foraminated, and means for rotating the shaft to circulate material in the shell and conduit.

2. A mixing-machine embodying a conico-cylindrical shell closable at one end with a removable head and having an inlet and an outlet, a return-conduit extended on the lower side of the shell, a conduit extension in the head that opens into the end of the shell through foraminations in the head, the opposite end of the conduit tapping the shell through foraminations therein, a shaft held to rotate in the head and in an end wall of the shell, a spiral blade thereon engaging the inner surface of the shell, and means for rotating the shaft.

3. A mixing-machine, embodying a conico-cylindrical shell having a hopper at an inlet therein, a fixed end wall, a removable head at the opposite end of said shell, a conduit on the shell, extending longitudinally, means for connecting the receiving end of the conduit with the discharging end of the shell, a shaft having a spiral blade and journaled at its ends in the end wall and removable head, a perforate screen intervening the receiving end of the conduit and the discharging end of the shell, a perforate screen between the discharging end of the conduit and the main chamber, and means for rotating the shaft and the spiral blade.

4. A mixing-machine embodying an essentially conico-cylindrical shell, having an inlet near one end, an integral end wall near said inlet, a laterally-flanged head securable on the opposite open end of the shell, a conduit partly on the head and partly on the shell, a shaft centrally and longitudinally held for rotation in the shell by a journaled engagement of its ends in perforations in the end wall and the head, means for clamping the head on the peripheral edge of the shell, a spiral blade formed on the shaft, a screw-blade, mounted on a short shaft held to rotate in the portion of the conduit formed on the head, said head having fine perforations therein opposite the screw-blade, similar perforations being formed in the wall of the shell near the termination of the conduit portion on said shell, means for simultaneously rotating the shafts and spiral blades thereon, and means for effecting the discharge of mixed material from the conduit.

In testimony whereof we have signed our names to this specification in the presence of two subscribing witnesses.

GUSTAF M. ANDERSSON.
AXEL G. AHLSTROM.

Witnesses:
DAVID W. MURRAY,
JOHN P. RATTIGAN